United States Patent
Karakas

(10) Patent No.: US 11,126,826 B1
(45) Date of Patent: Sep. 21, 2021

(54) MACHINE LEARNING SYSTEM AND METHOD FOR RECOGNIZING FACIAL IMAGES

(71) Applicant: shallow.AI Inc., Los Altos, CA (US)

(72) Inventor: Ahmet Karakas, Palo Alto, CA (US)

(73) Assignee: shallow.AI Inc., Los Altos, CA (US)

( * ) Notice: Subject to any disclaimer, the term of this patent is extended or adjusted under 35 U.S.C. 154(b) by 0 days.

(21) Appl. No.: 16/840,285

(22) Filed: Apr. 3, 2020

Related U.S. Application Data

(60) Provisional application No. 62/828,698, filed on Apr. 3, 2019.

(51) Int. Cl.
| | | |
|---|---|---|
| *G06K 9/46* | (2006.01) | |
| *G06K 9/00* | (2006.01) | |
| *G06N 3/08* | (2006.01) | |
| *G06K 9/62* | (2006.01) | |

(52) U.S. Cl.
CPC ..... *G06K 9/00281* (2013.01); *G06K 9/00248* (2013.01); *G06K 9/6217* (2013.01); *G06N 3/08* (2013.01)

(58) Field of Classification Search
CPC ........... G06K 9/00261; G06K 9/00288; G06K 9/00228; G06K 9/00268; G06K 9/00281; G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

U.S. PATENT DOCUMENTS

| | | | | |
|---|---|---|---|---|
| 8,027,521 B1 * | 9/2011 | Moon | ................ | G06K 9/00288 382/118 |
| 2012/0032960 A1 * | 2/2012 | Kameyama | ........ | H04N 7/17318 345/428 |
| 2012/0076367 A1 * | 3/2012 | Tseng | .................... | G06F 16/583 382/118 |
| 2014/0140625 A1 * | 5/2014 | Zhang | ................ | G06K 9/00677 382/195 |

\* cited by examiner

*Primary Examiner* — Quan M Hua
(74) *Attorney, Agent, or Firm* — Aka Chan LLP

(57) ABSTRACT

A machine learning system extracts features from images. A system and method predicts appearance type, attractiveness, gender, or ethnicity from a facial image. In a machine learning approach, predictor training is performed by using known data sets containing the classification information for a given facial image into the desired categories. When a new image is presented, the system applies this info to the new image. The training can be performed continuously while the system is being presented with new images and corrective results in a feedback loop. In another machine learning approach, a generative adversarial network is used to predict the desired categories based on the given facial image.

20 Claims, 9 Drawing Sheets

MACHINE LEARNING SYSTEM AND METHOD FOR RECOGNIZING FACIAL IMAGES

CROSS-REFERENCE TO RELATED APPLICATIONS

This patent application claims the benefit of U.S. patent application 62/828,698, filed Apr. 3, 2019, which is incorporated along with all other references cited in this application.

BACKGROUND OF THE INVENTION

This invention relates to computer and software, and more specifically to a technique of using machine learning to extract a feature from an image, such as determining a body mass index or body type for a person from a facial image of that person.

Human faces contain a number of cues, e.g., identity, emotional expression, age, gender, ethnicity, attractiveness, personality traits, and so on. For online commerce and social interaction, it is important to be able to extract facial features from an image or video and correlate them to other personal properties such as mood (such as happy, worried, tired, an others), gender, age, attractiveness, ethnicity, and others.

Therefore, there is a need for improved techniques to extract features or characteristics, including appearance type, attractiveness, gender, or ethnicity, of an individual based on images.

BRIEF SUMMARY OF THE INVENTION

A machine learning system extracts features from images. A system and method predicts appearance type, attractiveness, gender, or ethnicity from a facial image. In a machine learning approach, predictor training is performed by using known data sets containing the classification information for a given facial image into the desired categories. When a new image is presented, the system applies this info to the new image. The training can be performed continuously while the system is being presented with new images and corrective results in a feedback loop. In another machine learning approach, a generative adversarial network is used to predict the desired categories based on the given facial image.

In an implementation, a method includes providing a social graph, where the social graph includes a first type of node, referred to as a user-provided node, a first type of edge, referred to as a user-provided edge; and a second type of edge, referred to as a system-provided edge. The method includes using at least one electronic processor, managing the social graph including creating a user-provided node for each user of a system including the social graph; allowing a first user-provided node for a first user to become connected to a second user-provided node for a second user via a first user-provided edge; providing a third user-provided node for a third user; and monitoring first content contributed by the first user-provided node, second content contributed by the second user-provided node, and third content contributed by the third user-provided node in an online social platform represented by the social graph.

The first content includes a first facial image of the first user, the second content includes a second facial image of the second user, and the second content includes a third facial image of the third user. The method includes analyzing the first facial image and the determining a first appearance type based on the first facial image; analyzing the second facial image and the determining a second appearance type based on the second facial image; analyzing the third facial image and the determining a third appearance type based on the third facial image.

The method includes determining a first similarity factor between the first user-provided node and the third user-provided node, where the determination includes a calculation based on the determined first appearance type and the determined third appearance type; and determining a second similarity factor between the second user-provided node and the third user-provided node, where the determination calculation based on the determined second appearance type and determined third appearance type.

The method includes based on the first similarity factor, connecting the first user-provided node to the third user-provided node via a first system-provided edge, where the first user and third user are members of a first colony group of the social graph; and based on the second similarity factor, not connecting the second user-provided node to the third user-provided node via a system-provided edge, where the third user is not a member of the first colony group of the social graph.

In various implementation, the method can include delivering a first informational content to the first colony group of the social graph, where the first colony group includes user-provided nodes connected together via the first system-provided edge, which includes the first and third user-provided nodes, and the first informational content is not delivered to other users not connected via first system-provided edges.

The determined first appearance type includes at least one of attractiveness, gender, or ethnicity, or a combination. The determined first appearance type can includes at least one of the first user's facial attributes, the first user's skin color, the first user's eye color, or the first user's hair color, or a combination.

The analyzing the first facial image can include a machine learning technique including a facial metrology including at least one of a cheekbone to jaw width, a width to upper facial height ratio, a perimeter to area ratio, an eye size, a lower face to face height ratio, a face width to lower face height ratio, or a mean of eyebrow an height, or any combination of these. The machine learning technique can include at least one of convolutional neural network, self-learning neural network, generative adversarial network, or a facial fingerprints approach.

The analyzing the first facial image can include a machine learning technique including a facial metrology including at least one of calculating a ratio of at least one of ear length to interocular distance, ear length to nose width, mideye distance to interocular distance, mideye to nose width, mouth width to interocular distance, lips-chin distance to interocular distance, lips-chin distance to nose width, interocular distance to eye fissure width, interocular distance to lip height, nose width to eye fissure width, nose width to lip height, eye fissure width to nose-mouth distance, lip height to nose-mouth distance, length of face to width of face, nose-chin distance to lip-chin distance, nose width to nose-mouth distance, or mouth width to nose width, or any combination of these.

Via the first user-provided edge, the first user-provided node can be separated by one degree of separation from the second user-provided node. The managing the social graph can include allowing the second user-provided node to become connected to a fourth user-provided node for a fourth user via a second user-provided edge, where via the second user-provided edge, the first user-provided node is separated by two degrees of separation from the fourth user-provided node.

The method can include monitoring fourth content contributed by the first user-provided node, fifth content contributed by the second user-provided node, and sixth content contributed by the third user-provided node in an online social platform represented by the social graph; and monitoring first feedback by others to the fourth content contributed by the first user-provided node, monitoring second feedback by others to the fifth content contributed by the second user-provided node, and monitoring third feedback by others to the sixth content contributed by the third user-provided node.

The method can include from the monitored fourth content and first feedback by others to the first user-provided node, generating a first rating vector for the first user-provided node; from the monitored fifth content and second feedback by others for the second user-provided node, generating a second rating vector for the second user-provided node; and from the monitored sixth content and the third feedback by others for the third user-provided node, generating a third rating vector for the third user-provided node.

The method can include determining a third similarity factor between the first user-provided node and the third user-provided node, where the determination includes a computation of a cosine of the first rating vector and the third rating vector; and determining a third similarity factor between the second user-provided node and the third user-provided node, where the determination includes a computation of a cosine of the second rating vector and the third rating vector.

The method can include based on the fourth similarity factor, connecting the first user-provided node to the third user-provided node via a second system-provided edge, where the first user and third user are members of a second colony group of the social graph. The method can include based on the fourth similarity factor, not connecting the second user-provided node to the third user-provided node via a system-provided edge, where the third user is not a member of the second colony group of the social graph.

In an implementation, a method include providing a social graph, where the social graph including a first type of node, referred to as a user-provided node, a first type of edge, referred to as a user-provided edge; and a second type of edge, referred to as a system-provided edge. The method includes using at least one electronic processor, managing the social graph including creating a user-provided node for each user of a system including the social graph; allowing a first user-provided node for a first user to become connected to a second user-provided node for a second user via a first user-provided edge; and providing a third user-provided node for a third user.

The method includes monitoring first content contributed by the first user-provided node, second content contributed by the second user-provided node, and third content contributed by the third user-provided node in an online social platform represented by the social graph. The first content includes a first facial image of the first user, the second content includes a second facial image of the second user, and the second content includes a third facial image of the third user.

The method includes analyzing the first facial image and the determining a first appearance type based on the first facial image; analyzing the second facial image and the determining a second appearance type based on the second facial image; and analyzing the third facial image and the determining a third appearance type based on the third facial image.

The method includes monitoring first feedback by others to the first content contributed by the first user-provided node, monitoring second feedback by others to the second content contributed by the second user-provided node, and monitoring third feedback by others to the third content contributed by the third user-provided node; from the monitored first content and first feedback by others to the first user-provided node, generating a first rating vector for the first user-provided node; from the monitored second content and second feedback by others for the second user-provided node, generating a second rating vector for the second user-provided node; and from the monitored third content and the third feedback by others for the third user-provided node, generating a third rating vector for the third user-provided node.

The method includes determining a first similarity factor between the first user-provided node and the third user-provided node, where the determination includes a computation of a cosine of the first rating vector and the third rating vector; and determining a second similarity factor between the second user-provided node and the third user-provided node, where the determination includes a computation of a cosine of the second rating vector and the third rating vector.

The method includes based on the first similarity factor, connecting the first user-provided node to the third user-provided node via a first system-provided edge, where the first user and third user are members of a first colony group of the social graph; and based on the second similarity factor, not connecting the second user-provided node to the third user-provided node via a system-provided edge, where the third user is not a member of the first colony group of the social graph.

In various implementation, the method can include delivering a first informational content to the first colony group of the social graph, where the first colony group includes user-provided nodes connected together via the first system-provided edge, which includes the first and third user-provided nodes, and the first informational content is not delivered to other users not connected via first system-provided edges.

Via the first user-provided edge, the first user-provided node is separated by one degree of separation from the second user-provided node. the managing the social graph can include allowing the second user-provided node to become connected to a fourth user-provided node for a fourth user via a second user-provided edge, where via the second user-provided edge, the first user-provided node is separated by two degrees of separation from the fourth user-provided node.

The method can include receiving a reaction to the first informational content from one or more user-provided nodes connected together via the first system-provided edge in the first colony group; and based on the reaction, selecting a second informational content for delivery to the first colony group; and delivering the second informational content to the first colony group of the social graph. The method can include disallowing delivering of the first informational content to the second user-provided node, which is not connected to the first system-provided edge.

The managing the social graph can include allowing the second user-provided node to become connected to a fourth user-provided node for a fourth user via a second system-provided edge. The method can include delivering a first informational content to a first colony group of the social graph, where the first colony group includes user-provided nodes connected together via the first system-provided edge, which includes the first and third user-provided nodes; and delivering a second informational content to a second colony group of the social graph, where the second colony group includes user-provided nodes connected together via the second system-provided edge, which includes the second and fourth user-provided nodes.

The following U.S. patents applications are incorporated by reference along with all other references cited in this application: 62/344,938 and 62/344,946, filed Jun. 2, 2016; Ser. Nos. 15/612,546, 15/612,587, 15/612,603, 15/612,633, and 15/612,655, filed Jun. 2, 2017; Ser. No. 15/937,804, filed Mar. 27, 2018; 62/477,343, filed Mar. 27, 2017; Ser. No. 16/102,672, filed Aug. 13, 2018; 62/544,323, filed Aug. 11, 2017; Ser. Nos. 16/380,765 and 16/380,883, filed Apr. 10, 2019; 62/655,801 and 62/655,803 filed Apr. 10, 2018; Ser. Nos. 16/597,805 and 16/597,806, filed Oct. 9, 2019; 62/744,039 and 62/744,042, filed Oct. 10, 2018; 62/827,806, filed Apr. 1, 2019; 62/828,154, filed Apr. 2, 2019; 62/828,698, filed Apr. 3, 2019; Ser. No. 16/837,986, filed Apr. 1, 2020; and Ser. No. 16/839,028, filed Apr. 2, 2020.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
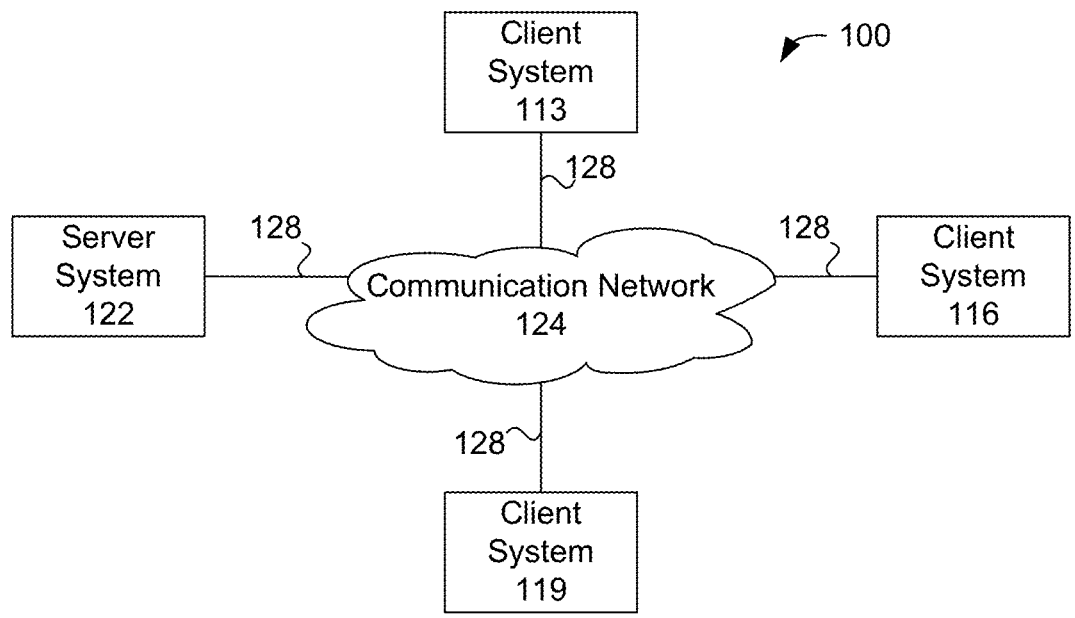
FIG. 1 shows a simplified block diagram of a client-server system implemented in a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a standalone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
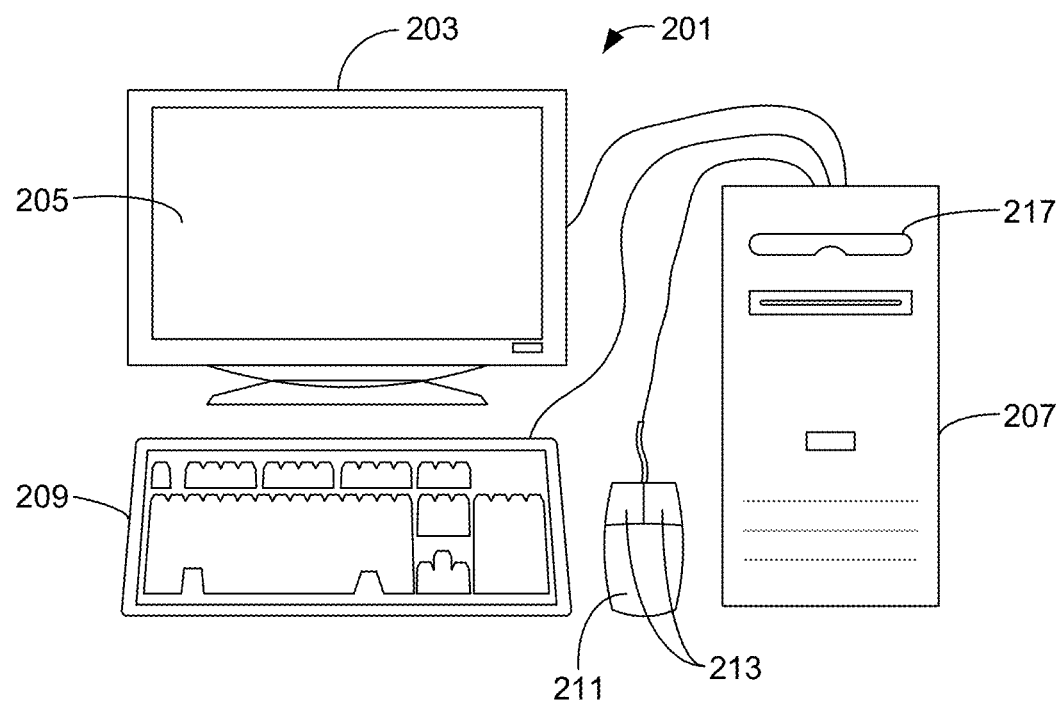
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone X), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
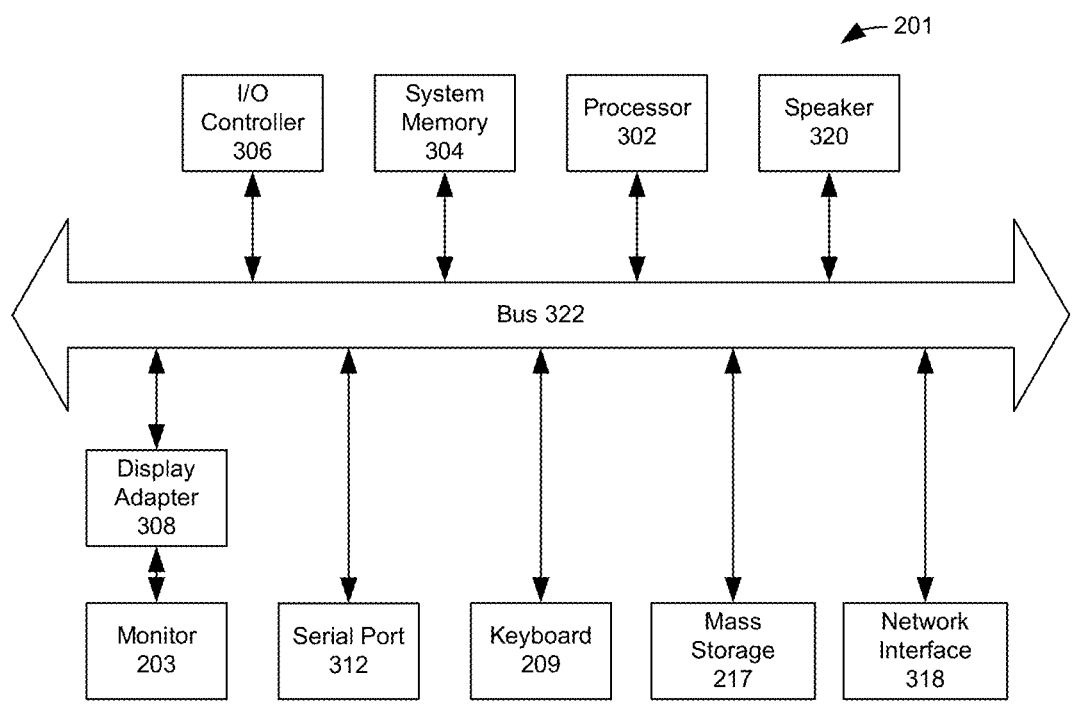
FIG. 3 shows a system block diagram of a client computer system used to execute application programs such as a web browser or tools.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1×RDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

We present a system and method that uses facial images to connect users in a social interaction platform, such as mobile and web apps in mobile or stationary computing devices. This matching is done automatically by using machine learning technology and can be used to recommend a user possible matches for social networking, dating, playing games, and others.

Computing platforms can be classified into two categories: mobile and stationary platforms.

Mobile computing platforms: are handheld computing devices, typically having a display screen with a touch input or keyboard, or both. They have an operating system (OS) and can run various types of application software, also known as App. Most handheld devices can be equipped with WiFi, Bluetooth, GPS and RF capabilities that allow connections to cellular networks, the Internet or other devices for voice or data communication. Smartphones, PDAs, tablet computers, wearable computers such as smart watches, laptop computers, personal navigation devices and cameras are some of the popular examples.

Stationary computing platforms: include servers, mainframe and supercomputers and desktop computers. Typically, these platforms have great computing power, therefore, requiring significant electric power to operate. Therefore, their physical sizes or power requirements, or a combination, prevent them from being a mobile device. Servers operate within a client-server architecture. The server part is a system that responds to requests across a computer network to provide a service. The client is the component that generates the requests. The clients typically connect to the server through the network but may also run on the same computer. Another typical arrangement is peer-to-peer networking that enables all computers to act as either a server or client as needed.

Human faces contain a number of cues, e.g., identity, emotional expression, age, gender, ethnicity, attractiveness, personality traits, and so on. Extracting facial features and correlating them to other personal properties such as mood (such as happy, worried, tired, an others), gender, age, attractiveness, ethnicity, and others, can be modeled by a machine learning system.

Appearance Types

Face Geometry and Attractiveness

There is no universal definition of attractiveness, it's dependent on many factors such as culture, ethnicity, motion (such as gestures, walking, dancing), dress, and others.

Analysis of attractiveness of faces has long been a topic of research. Literature has identified many different factors that can be related to attractiveness including symmetry, averageness, sexual dimorphism, adherence to the golden ratio, conformance to neoclassical canons in the determination of attractiveness of a face.

Golden Ratios:

Example 1: Assume Flw is length of the face divided by width of the face. The ideal result, as defined by the golden ratio, is roughly Flw=1.6, which means a beautiful person's face is about 1.5 times longer than it is wide.

Example 2: Consider three segments of the face: from the forehead hairline to a spot between the eyes, from between the eyes to the bottom of the nose, and from the bottom of the nose to the bottom of the chin. If the numbers are equal, a person is considered more beautiful.

Example 3: On a perfect face, the length of an ear is equal to the length the nose, and the width of an eye is equal to the distance between the eyes.

The face geometry plays an important role in attractiveness. Attractiveness is a complex aspect of a face and it involves many other factors, such as effects of averageness. The perception of attractiveness changes over time.

It is important to distinguish same sex ratings from opposite sex ratings. How males and females view attractiveness in images of the same and opposite gender varies significantly based on the person's own gender.

The human attractiveness is a subjective property, varying person to person, but some studies suggest that most people on certain populations may share a common taste for facial attractiveness. The attractiveness ratings show very high agreement between groups of raters belonging to the same culture. Various hypotheses, from cognitive, evolutional and social perspectives, have been proposed to describe and interpret the common preferences for facial beauty. One of the findings is that the facial symmetry is more important than averageness in facial attractiveness. In addition, faces with certain extreme features, such as extreme sexually dimorphic traits, may be more attractive than average faces. Various conditions which may contribute to facial attractiveness such as neonate features, pleasant expressions and familiarity affect subjective attractiveness. Furthermore, several studies conclude that some facial qualities are universally physically attractive to people.

Ethnicity

There are several main ethnic groups that are universally popular, such as Caucasians, Africans, Asians, Hispanics, Middle Eastern, and Indians. These and many more subcategories are mainly defined by certain appearance attributes such as skin color, hair color, body shape, facial shape, hair type (such as straight versus curly), eye shape, and so on.

Face Metrology

Facial measurements are unique to each individual. Certain facial landmarks can be measured from a given facial image such as coordinates or ratios of eyes, eyebrows, nose, chin, mouth as well as assessment of the overall face eccentricity such as round, square, rectangular, oblong, and others.

By using image analysis, certain aspects defining facial and physical geometry can be measured, such as $\Gamma_1$: the distance between eyes, $\Gamma_2$: the nose-mouth distance, $\Gamma_3$: the mouth length, $\Gamma_4$: the mouth width, $\Gamma_5$: the nose length, $\Gamma_6$: the nose width, $\Gamma_7$: the eyes-mouth distance, $\Gamma_8$: the eyes-nose distance, $\Gamma_9$: the eyes area, $\Gamma_{10}$: the mouth area, $\Gamma_{11}$: the eyebrows-face distance, $\Gamma_{12}$: the jaw width, $\Gamma_{13}$: the jaw height, $\Gamma_{14}$: the mouth-chin vertical distance.

Figure 4:
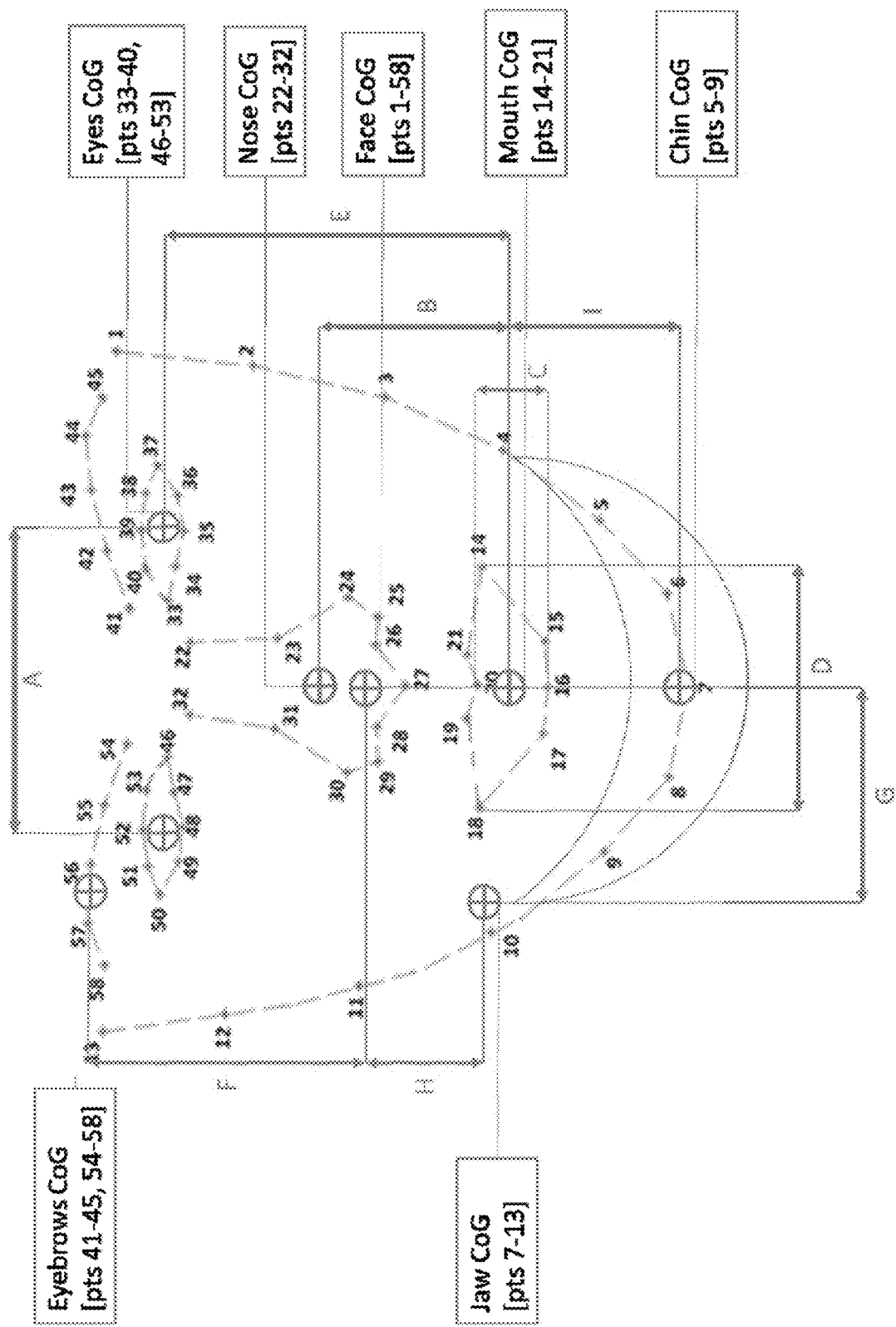
FIG. 4 shows some parameters describing facial biometrics measures.

FIG. 4 shows some parameters describing facial biometrics measures. CoG is the center of gravity of a particular area.

In addition, other physical appearance parameters, such as $\Gamma_{15}$: hair color, $\Gamma_{16}$: skin tone, $\Gamma_{17}$: eye color, $\Gamma_{18}$: height, $\Gamma_{19}$: waist length, $\Gamma_{20}$: chest length, $\Gamma_{21}$: leg length, $\Gamma_{22}$: arm length, can be determined from images.

These biometric features can either be extracted by a convolutional neural network (CNN), or by using a commercially available software tool.

Similarly, based on the face metrology, several different facial features can be used to establish a correlation to the appearance types such as:

1. CJWR: the ratio of the cheekbone width to jaw width. The cheekbone width is the distance between P1 and P15, and jaw width is the distance between P4 and P12.
2. WHR: the ratio of the cheekbone width to upper facial height which is the distance between P67 and N1.
3. PAR: the ratio of the perimeter to area of polygon running through P1P4P8P12P15P1, so the computation is given by Perimeter(P1P4P8P12P15P1)/Area (P1P4P8P12P15P1), and the perimeter is computed by the sum of line segment lengths, and the area is the sum of all related triangles, respectively;
4. ES: the average size of eyes, which is the average distance between P28 and P33 minus the distance between P30 and P35.
5. LF/FH: the lower face to face height ratio. The lower face is the part of the face below the cheekbone (i.e., line P1P15). The lower face height is the distance between the cheekbone and the lowest point in the jaw which is the distance LFH. The face height is the distance between the highest point N2 and the lowest point P8 on the face.
6. FW/LFH: the face width to the lower face height ratio. The face width is the cheekbone width.
7. MEH: the average distance between eyebrows and the upper edge of eyes, which is the mean of distances between P22 to P28, N3 to P29, P30 to P25, P19 to P35, N4 to P34, and P16 to P33.

where
CJWR is the cheekbone to jaw width,
WHR is the width to upper facial height ratio,
PAR is the perimeter to area ratio,
ES is the eye size,
LF/FH is the lower face to face height ratio,
FW/LFH is the face width to lower face height ratio,
and MEH is the mean of eyebrow height.

Figure 5:
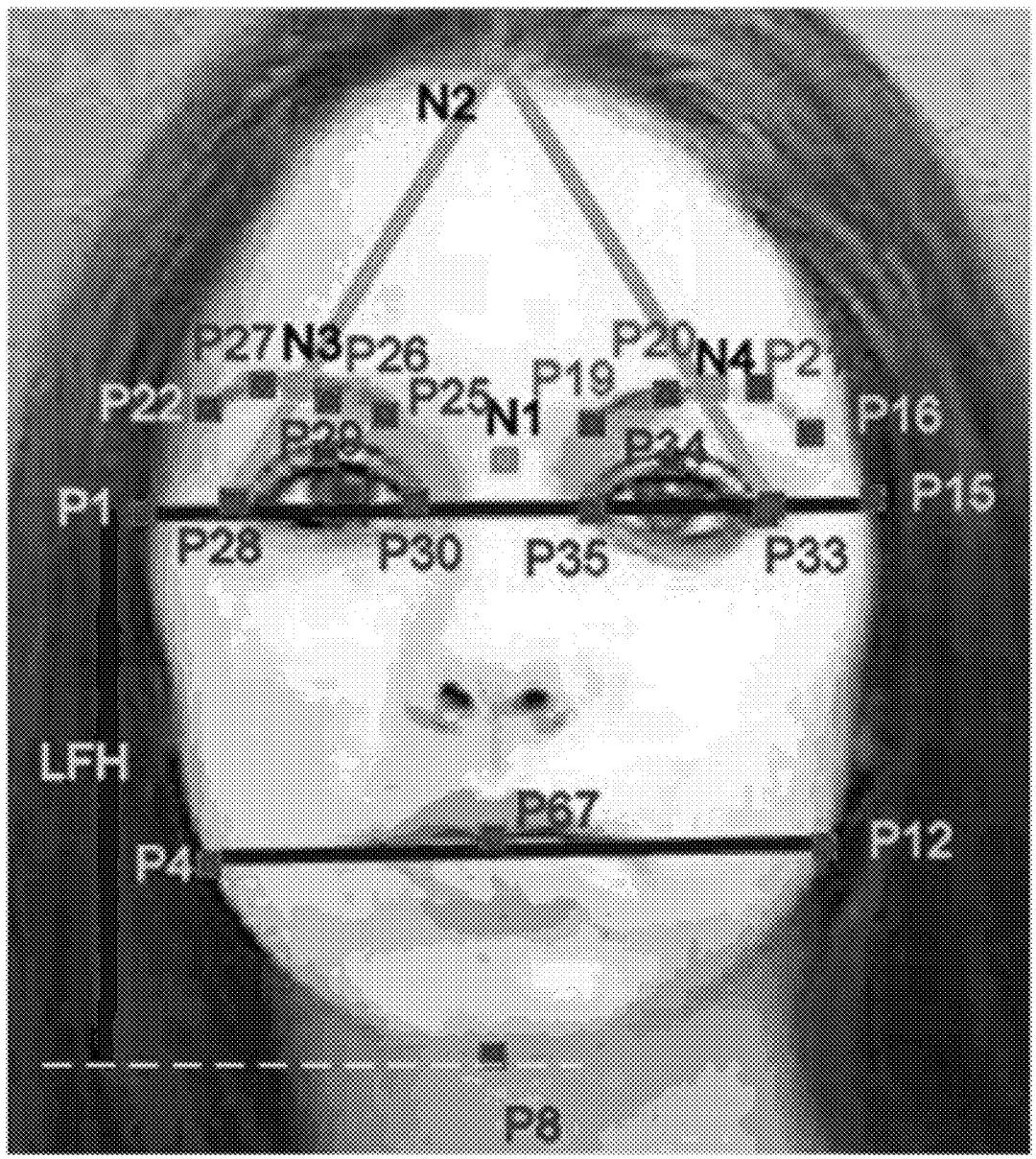
FIG. 5 shows an example for a set of facial metrology measurements.

FIG. 5 shows an example for a set of facial metrology measurements.

Neural Network Architectures for Extracting Facial Fingerprints

In this section we show that a given image is first processed with a convolutional network followed by a self-learning feature extractor to determine the essential attributes of a facial image.

Convolutional Neural Networks (CNN)

In machine learning area, "convolutional neural network" (CNN) terminology is used for a class of deep, feed-forward artificial neural network. CNNs use a variation of multilayer perceptrons designed to require minimal preprocessing. They are also known as shift invariant or space invariant artificial neural networks, based on their shared-weights architecture and translation invariance characteristics.

Convolutional networks were inspired by biological processes in that the connectivity pattern between neurons resembles the organization of the animal visual cortex. Individual cortical neurons respond to stimuli only in a restricted region of the visual field known as the receptive field. The receptive fields of different neurons partially overlap such that they cover the entire visual field.

CNNs use relatively little pre-processing compared to other image classification algorithms. This means that the network learns the filters that in traditional algorithms were hand-engineered. This independence from prior knowledge and human effort in feature design is a major advantage.

A CNN consists of an input and an output layer, as well as multiple hidden layers. The hidden layers of a CNN typically consist of convolutional layers, pooling layers, fully connected layers and normalization layers.

Convolutional layers apply a convolution operation to the input, passing the result to the next layer. The convolution emulates the response of an individual neuron to visual stimuli. Each convolutional neuron processes data only for its receptive field.

Although fully connected traditional feedforward neural networks can be used to learn features as well as classify data, it is not practical to apply this architecture to images. A very large number of neurons would be needed, since each pixel in an image is represented by a weight. For example, a fully connected layer for a image of size 100×100 pixels we need 10000 weights for each neuron. The convolution operation brings a solution to this problem as it reduces the number of free parameters, allowing the network to be deeper with fewer parameters. For instance, regardless of image size, tiling regions of size 5×5, each with the same shared weights, requires only 25 learnable parameters. In this way, it resolves the vanishing or exploding gradients problem in training traditional multi-layer neural networks with many layers by using backpropagation.

CNNs share weights in convolutional layers, which means that the same filter is used for each receptive field in the layer; this reduces memory footprint and improves performance.

Self-Learning Neural Networks (SLN)

Supervised learning methods have been well studied over the years and they offer a great way to model nonlinear system behavior as long as a reference model is available. Unfortunately, this is not possible in every application.

The self-learning networks, on the other hand, are type of neural networks that offer an unsupervised learning method to extract certain characteristics from data.

By using the same dataset for both inputs and targets, the SLN learns an approximation to the identity function to make outputs as closely as possible to inputs.

Figure 6:
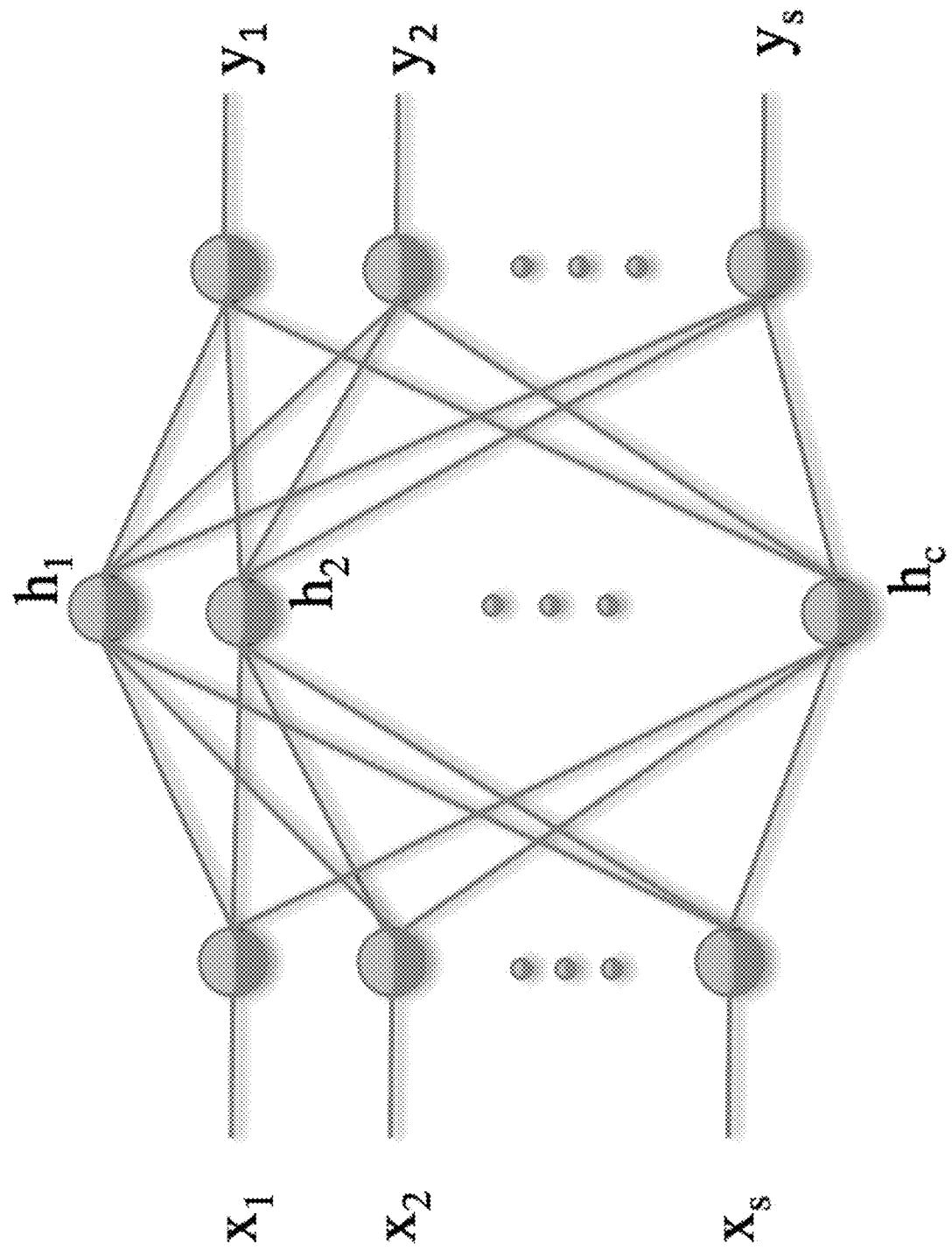
FIG. 6 shows a self-learning neural network.

FIG. 6 shows a self-learning neural network. Selecting the number of hidden nodes usually provides options to explore certain features in data. In other words, by varying this number one can adjust the resolution of the representation of an input-output relationship. For example, if the number of hidden nodes is fewer than the actual mapping function requires, the SLN works as a compressor. Similarly, if the number of hidden nodes is much higher than the number of input nodes, some interesting sparsity related features of the data can be discovered.

Generative Adversarial Networks (GAN)

Even though commonly used to solve many nonlinear problems, the disadvantage of supervised systems is their need for large sums of reference data for training. Generating such large number of samples is usually difficult. Therefore, there is a strong motivation to improve the unsupervised machines and to lessen the reliance on the supervised ones. Generative adversarial networks (GANs) offer an architecture solution to implement an unsupervised neural network, significantly improving performance compared to traditional ones.

Figure 7:
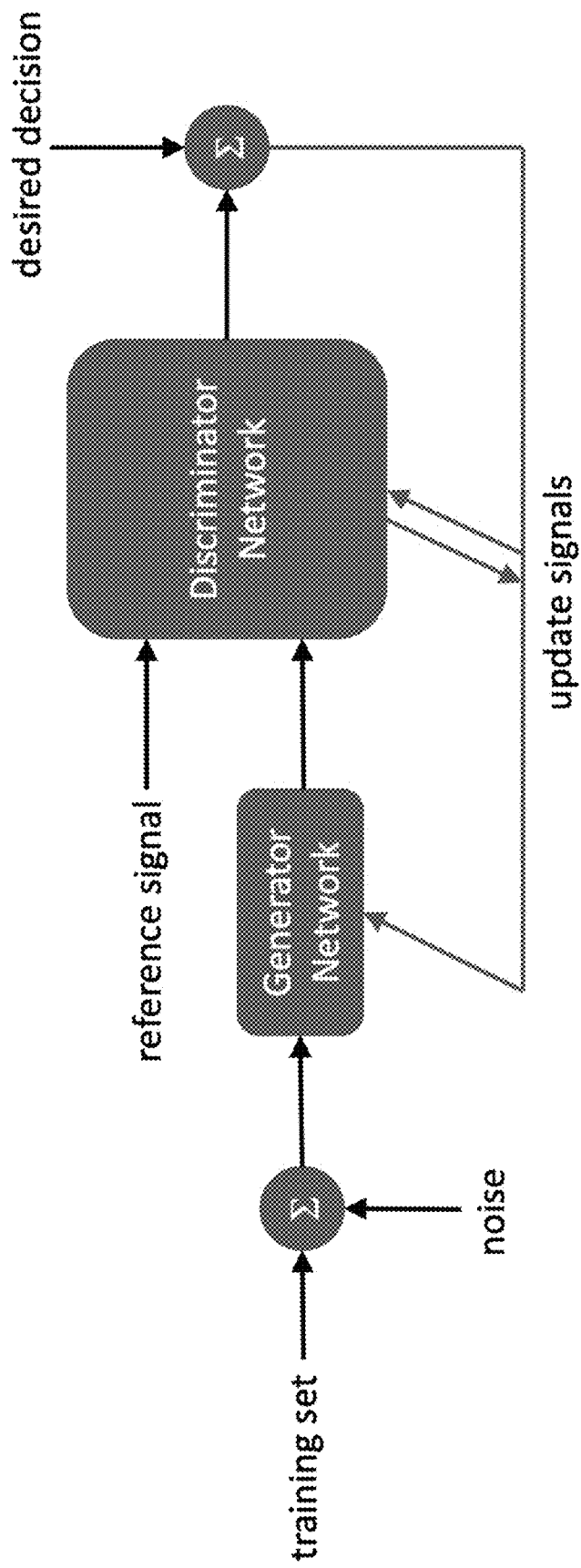
FIG. 7 shows generative adversarial network (GAN) training.

GANs are a class of algorithms used in unsupervised machine learning, implemented by a system of two neural networks contesting with each other in a zero-sum game framework. GANs contain two independent neural nets that work separately and act as adversaries as depicted in FIG. 7. The first neural net is called the Discriminator (D), which is a classifier that performs decision making during the normal operation once the training is complete. The second network is called the Generator and is tasked to generate fake samples that resemble real samples.

In other words, G network generates candidates and the other evaluates them by learning to map from a latent space to a particular data distribution of interest, while D network discriminates between instances from the true data distribution and candidates produced by the generator. The generative network's training objective is to increase the error rate of the discriminative network, i.e., "fool" the discriminator network, by producing novel synthesized instances that appear to have come from the true data distribution.

In practice, a known dataset serves as the initial training data for the discriminator. Training the discriminator involves processing samples from the dataset, until it reaches some level of accuracy. Typically, the generator is seeded with a randomized input that is sampled from a predefined latent space. Thereafter, samples synthesized by the generator are evaluated by the discriminator. A weight update rule, such as backpropagation, can be applied in both networks so that the generator produces better results, while the discriminator becomes more skilled at flagging synthetic images. The generator is typically a deconvolutional neural network, and the discriminator is a convolutional neural network.

Generative models are the ones that predict by generating the most likely outcome given a sequence of input samples. As an example, a generative model can predict the next likely video frame based on the previous frames. Another example is search engines that try to predict the next likely word before it is entered by the user. Another example is an image classifier D designed to identify a series of images depicting known shapes. Now consider an adversary (G) with the mission to fool D using carefully crafted images that look almost right but not quite. This is done by picking a legitimate sample randomly from training set and synthesizing a new image by randomly altering its features by adding random noise.

During training, D is presented with a random mix of legitimate images from training data as well as fake images generated by G. Its task is to identify correct and fake inputs. Based on the outcome, both machines try to fine-tune their parameters and become better in what they do. If D makes the right prediction, G updates its parameters in order to generate better fake samples to fool D. If D's prediction is incorrect, it tries to learn from its mistake to avoid similar mistakes in the future. The reward for network D is the number of right predictions and the reward for G is the number of D's errors. This process continues until an equilibrium is established and D's training is optimized.

FIG. 7 shows generative adversarial network (GAN) training.

Facial Fingerprints Approach

In this section we outline a method to extract essential components of a given image representing its relationship to the appearance types.

The Feature Extraction Network to Obtain Facial Fingerprints

The following self-learning network is used to extract essential components of a given image representing its relationship to the appearance types.

Figure 8:
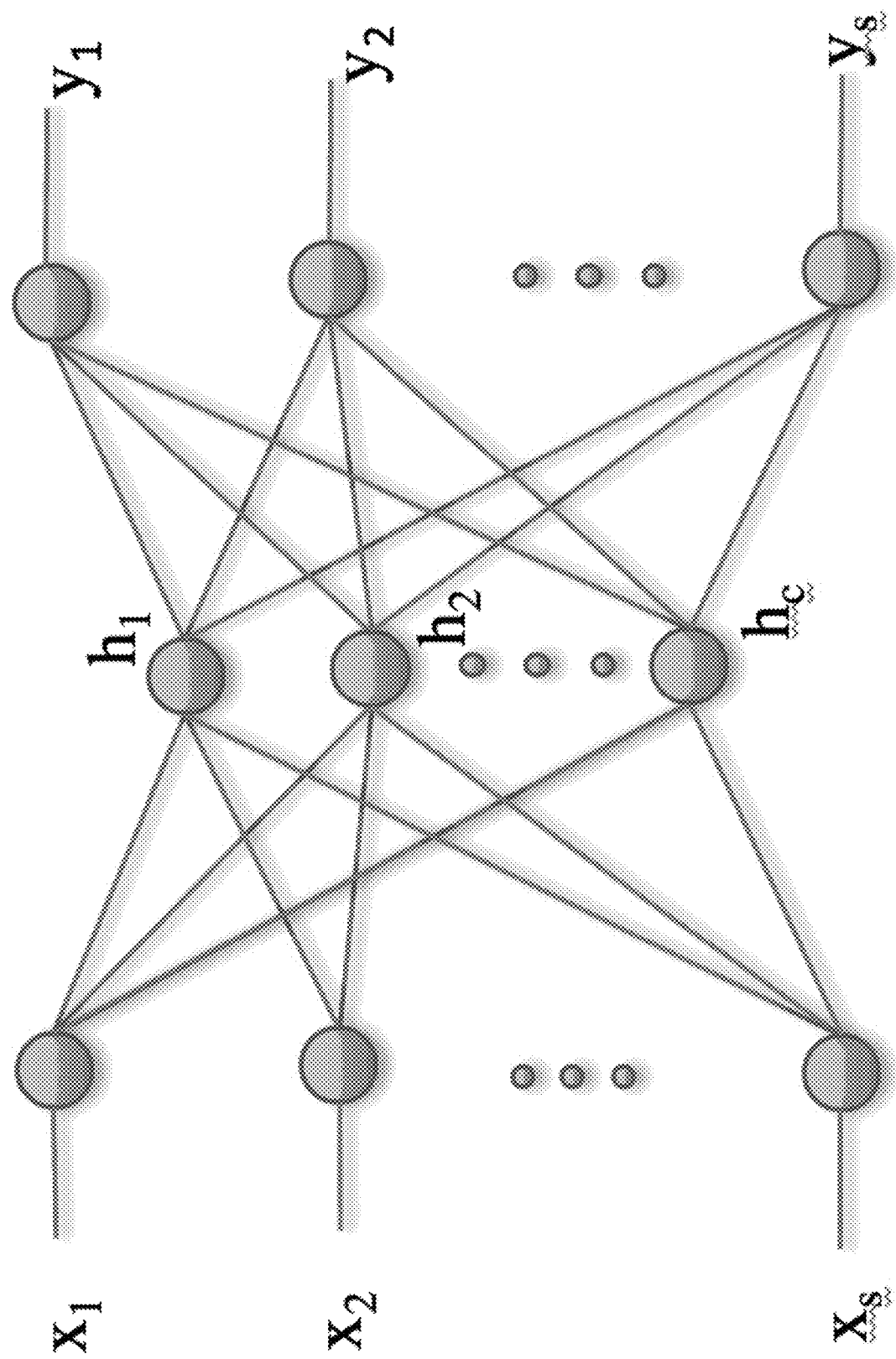
FIG. 8 shows a self-learning network (SLN) for feature extraction.

FIG. 8 shows a self-learning network (SLN) for feature extraction. Depending on the required compression level, the number of hidden nodes on the SLN is determined to capture the essential aspects of an image.

Figure 9:
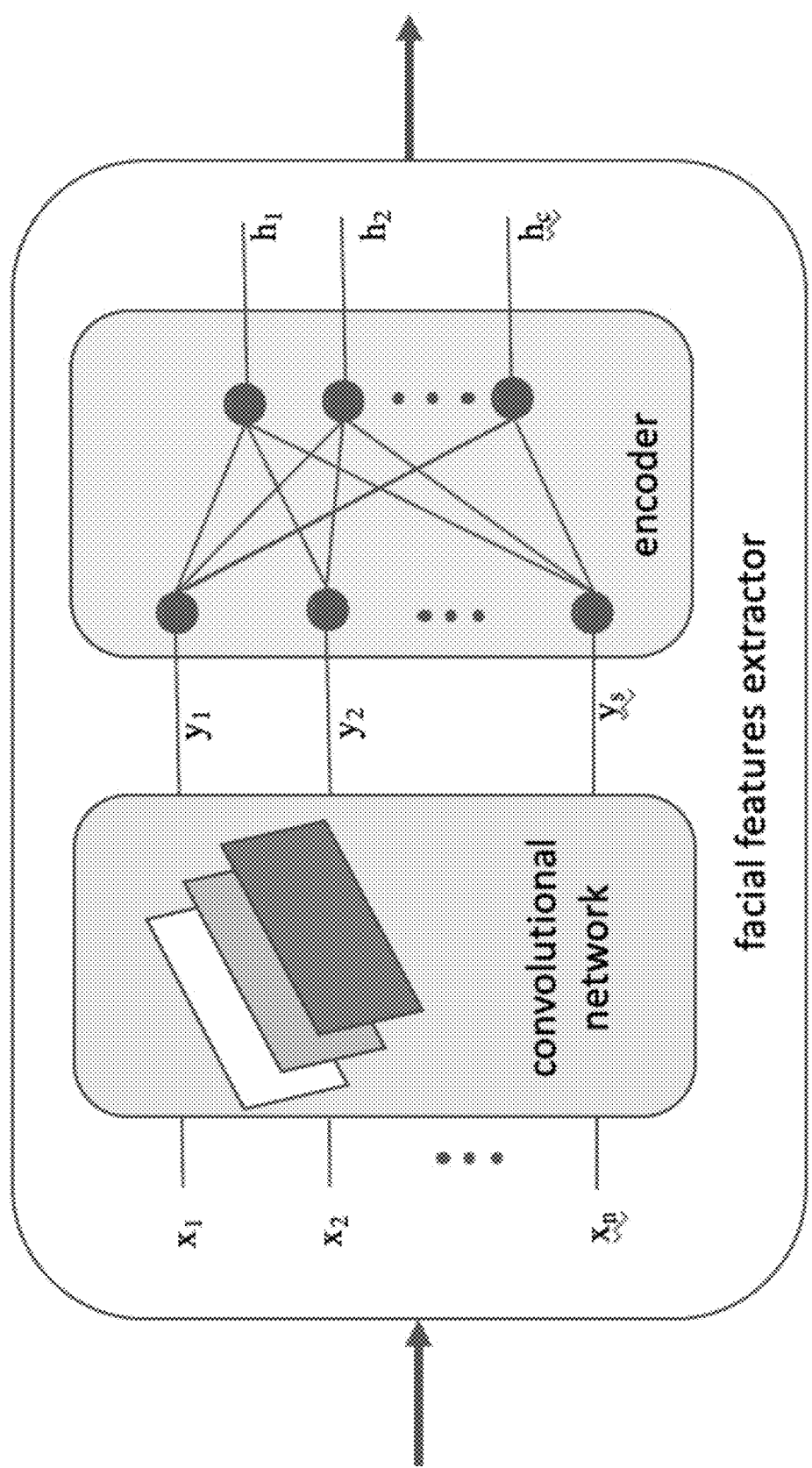
FIG. 9 shows a SLN-based encoder connected to a convolutional layer for image processing.

FIG. 9 shows a SLN-based encoder connected to a convolutional layer for image processing. Once the SLN size is selected and trained with data such that the output vector y is the same as the input vector x, a convolutional layer is connected to process the input images.

Neural Network-Based Classifier for Appearance Types

The fingerprint extractor outlined in the previous section is used to compress the facial images by preserving the essential aspects defining a person's appearance. These types include:

1. predict person's attractiveness
2. predict person's gender
3. predict person's ethnicity
4. classify skin, eye, and hair color.

Overall System

We connect the fingerprint extractor to the rest of the system to train and classify the appearance types.

The predictor is training is performed by using known data sets containing the classification information for a given facial image into the abovementioned categories. When a new image is presented, the system applies this info a new image. The training can be performed continuously while the system is being presented with new images and corrective results in a feedback loop.

Figure 10:
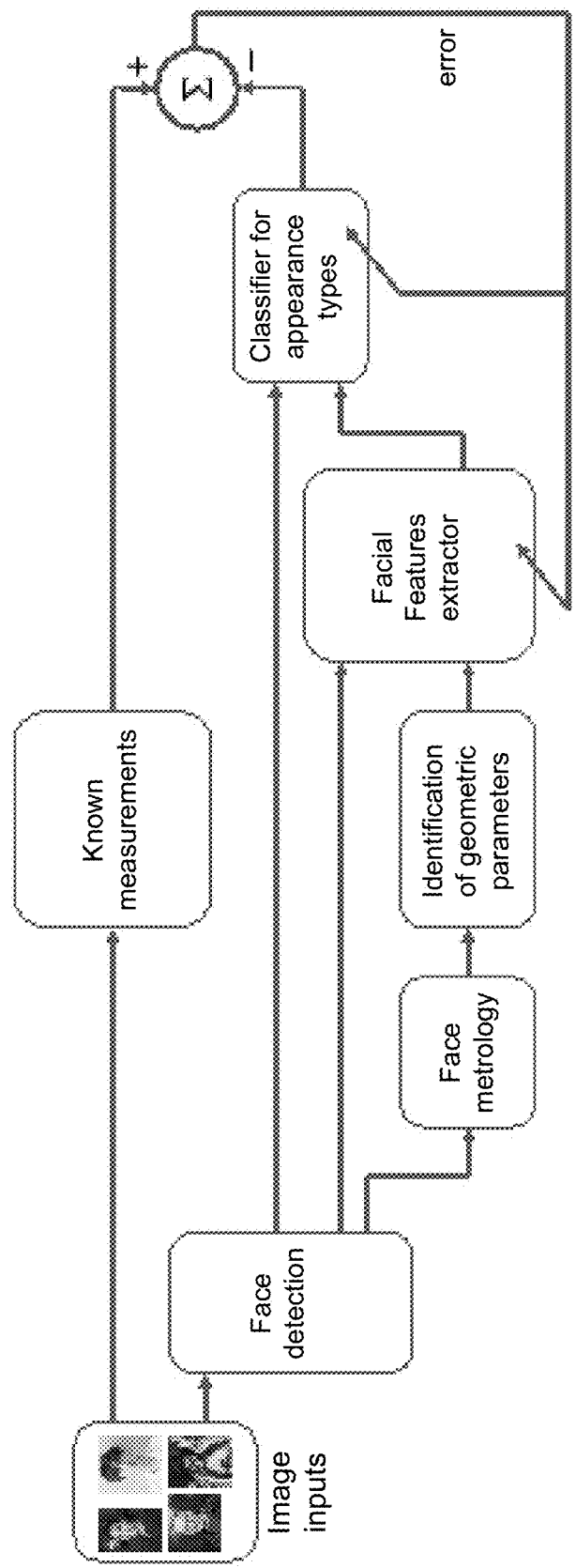
FIG. 10 shows an overall system to classify appearance types.

FIG. 10 shows an overall system to classify appearance types.

Collaborative Systems

Approaches to recommendation broadly fall into the two categories of user-based and item-based recommenders.

Clustering in Feature Space

What follows is a strategy for taking user feedback data gathered in a social networking setting and deriving from it a user preference metric. From preference ratings, we derive feature-space projections of users and items using a singular value decomposition-based technique, and use the resulting projections to demonstrate a clustering method based on a self-learning neural network.

Deriving Preference Ratings from User Feedback

In this description, a "response" refers to a Boolean swipe-right or swipe-left interaction with a content item, while a "rating" refers to a continuous value computed from the response and other implicit feedback.

A content recommendation system can only be as accurate as its modeling of user preference. Like-or-dislike mechanics would offer the user simple and immediate expressiveness, but provide limited information by themselves. To build a more nuanced model for a recommender system, this is supplemented with implicit feedback. In the present system, these inputs are:

$A_{ij}$, a Boolean value representing user i's authorship of item j.
$R_s$, a Boolean value representing a like response.
$R_k$, a Boolean value representing a dislike response.
$C_{ij}$, the number of comments user i made on item j.
$L_{ij}$, the number of comments user i liked on item j.

Once these parameters are gathered for a given user or item interaction, the feedback is weighted and combined into a user preference rating according to a formula:

$$p_{ij}=w_a A_{ij}(1-A_{ij})[w_s R_s + w_k R_k + w_c K(C_{ij}) w_L \Lambda(L_{ij})]$$

The tunable parameters in this formula are:
$w_a$ is the weight assigned to authorship,
$w_s$ is the weight assigned to a like response,
$w_k$ is the weight assigned to a dislike response,
$w_c$ is the weight assigned to a comment,
$w_L$ is the weight assigned to a comment-liked,
$K$ and $\Lambda$ are functions which quantize and bound comments and comment-likes, respectively.

The weight values w's are central to the behavior of the recommender system, which will try to recommend content to users which would result in the highest-rated interactions. For example, a large positive $w_c$ will lead the system to prioritize the most conversation-provoking content items in the system; a large positive $w_s$ value will tend toward contents for which a favorable Boolean response is expected, and so on. By adjusting these weights, the network can be adapted to the behaviors of its users as they become more known, and optimize for positive user or content reaction, high conversational engagement, or any other quantifiable parameter which can be extracted from implicit feedback channels.

Projections into Feature Space with SVD++

After computing $p_{ij}$ for all known responses, we have a user preference matrix $U \in \mathbb{R}^{n \times m}$ where n is the number of users and m is the number of content items. This matrix is extremely large, sparse, and mostly unknown. Singular value decomposition provides both dimensionality reduction and an approximation of the unknown values based on features extracted from the known values. We obtain $$U = P \Sigma Q^T$$

where $P \in \mathbb{R}^{n \times r}, \Sigma \in \mathbb{R}^{r \times r}$, and $Q \in \mathbb{R}^{m \times r}$.

$\Sigma$ is a diagonal matrix in which the values along the diagonal are, $$\sigma_1, \sigma_2, \ldots, \sigma_r,$$

the singular values of U ordered by significance. By choosing the s most significant singular values, we can discard most columns of P and Q and arrive at an approximation:

$$U' = \overline{P} \overline{\Sigma} \overline{Q}^T$$

where $\overline{P} \in \mathbb{R}^{n \times s}$, $\overline{\Sigma} \in \mathbb{R}^{s \times s}$ and $\overline{Q} \in \mathbb{R}^{m \times s}$.

Crucially, the rows of $\overline{P}$ and $\overline{Q}$ are now feature vector representations of the users and content items from the original preference matrix U.

Some adaptations are made to this concept in order to make it computationally feasible and defined in the present scenario (in which most values in U are unknown). The goal is to decompose the sparse matrix U into two matrices, which preserve $$\overline{U} = \overline{P} * \overline{Q}^T$$

as closely as possible. The computation itself is performed using a gradient descent scheme. The SVD++ factorization, one of the schemes described in \cite{koren}, predicts user ratings as follows:

$$r'_{ij} = \mu + b_i + b_j + f_j * \left( f_i + \frac{1}{\sqrt{|N(u)|}} \sum_{k \in N(u)} f_k \right)$$

where
$r_{ui}'$ is the prediction for user u's rating of item i.
$\mu$ is the mean of all user preference ratings.
$b_i$ is user u's baseline rating.
$b_j$ is item i's baseline rating.
$f_j$ is item i's feature vector, a row of $\overline{Q}$.
$f_i$ is user u's feature vector, a row of $\overline{P}$.
$N(u)$ is the set of all items user i has responded to.
$f_k$ are feature vectors representing items from the set $N(u)$.

The values for $b_i$, $b_j$ and all feature vectors determined by minimizing the total error $$E_t = \frac{1}{2} \sum_{r_{ij} \in R_k} |r_{ij} - r'_{ij}|^2 + \frac{\lambda}{2} \sum_{all\ i} \|f_i\|^2 + \frac{\lambda}{2} \sum_{all\ j} \|f_j\|^2$$

over the set of all explicitly known ratings in U.

The singular value decomposition's validity and usefulness in this setting is that it provide the best reduced-rank linear approximation to the original matrix U; in other words, by discarding the least significant singular values, the SVD reduces rank while maintaining the lowest possible Frobenius norm of the difference matrix U−U'. This norm is precisely what the first term attempts to minimize, with regularization terms added to discourage overfitting on the values of U which are unknown.

This decomposition serves multiple purposes. The row vectors of the matrices $\overline{P}$ and $\overline{Q}$ have the singular values from the diagonal of $\overline{\Sigma}$ folded in, and are now projections of users and content items into s-dimensional feature space. These projections are suitable for use in clustering computations to identify groups of like-minded users and similar items. as well as linear combinations to provide predictions for collaborative filtering and recommendation.

One of the computationally efficient ways of using SVD in recommender systems is matrix factorization. This method is an approximation to the actual SVD by minimizing an error metric, such as sum of squared errors, iteratively. The minimization can be done, for example, by using gradient descent methods.

$$\min_{p,q,b} \sum_{u,i} (r_{ui} - \mu - b_u - b_i - p_u^T q_i)^2 + \lambda(\|p_u\|^2 + \|q_i\|^2 + b_u^2 + b_i^2)$$

Once the recommendations are computed in the reduced order space, the mapping back to the original space for the entire users and items can be calculated by modifying the bias term as $$r_{ui}' = b_{ui} + p_u^T q_i$$

To make calculations even more efficient, the SVD++ method uses the following prediction rule:

$$\min_{p,q,b} \sum_{u,i} \left( r_{ui} - \mu - b_u - b_i - q_i^T \left( p_u + |N(u)|^{-1/2} \sum_{j \in N(u)} y_j \right) \right)^2 +$$

$$\lambda \left( \|p_u\|^2 + \|q_i\|^2 + b_u^2 + b_i^2 + \sum_{j \in N(u)} |y_i|^2 \right)$$

A gradient descent, controlled by a learning rate and regularization terms, allows some flexibility and tradeoffs between computational load and accuracy. The term "accuracy" here requires clarification: the recommender system is functioning on user preference ratings, which were computed earlier from a combination of explicit and implicit user feedback. To assess a result, it is necessary to define what it means for a recommendation to be "accurate enough." Beyond this point, additional iterations of gradient descent may provide greater numerical accuracy, but may not provide value to the broader recommendation system. This can, for example, be quantified by normalizing measured squared-error against the distance between the average like and dislike in the preference computation:

$$E_{normalized} = \frac{RMSE}{|\mu_{like} - \mu_{dislike}|}$$

User Matching
FaceKernels Approach
Various representative reference face types are defined a priori and used as "faceKernels" such as:
1. a female, with brown curly hair, brown eyes, oval face and thick eye brows
2. a male, with short hair, hazel eyes, straight eye brows, long ears and rectangular face.
Representative images for each faceKernels are used to test a given user's reaction and characterize his or her preference.
We apply the previously determined "tags" for appearance types to label each FaceKernel for its gender, ethnicity, hair style, and others.
When a new user is present, use the methods described above (e.g., facial fingerprints approach) to determine that user's appearance type.
Typical appearance types include:
1. predict person's attractiveness
2. predict person's gender
3. predict person's ethnicity
4. classify skin, eye, and hair color.
Then, calculate the new user image's distance to faceKernels and store. For this purpose, a neural network-based classifier, or predictor can be used.
Then, use this information to offer new dating matches to this user.
Assume 100 different faceKernels representing all possible face types in a given population have been generated. To determine a new user's taste, all these images are presented to him or her. Then all the available candidates are ordered with respect to the distance to this user's taste.
The faceKernels based user taste characterization is especially useful when a new user joins the platform, i.e., the cold-start case.
After a new user is exposed to a sufficient number of candidates and his or her preferences are stored, based on the person's previous votes, a common biometric parameter set representing his or her preferences is determined and updated for upcoming matches.
Self-learning networks (SLN), such as the ones in FIGS. 8 and 9, can be used to represent facial images with faceKernels. Similarly, facial fingerprints, eigenfeatures and eigenfaces, and faceKernels can be calculated by an SVD of the input, as well as by a SLN.
The generative adversarial networks (GANs), such as the one shown in FIG. 7, can be trained to determine faceKernels, and classify a given image.
Collaborative Matching Approach
Various representative reference face types can be defined and used as "faceKernels" such as:
1. A female, with brown curly hair, brown eyes, oval face, thick eye brows, and so on.
2. A male, with short hair, hazel eyes, straight eye brows, long ears, rectangular face, and so on.
Instead of modeling each individual's taste and matching with the images in the database, a collaborative approach is taken for computational efficiency. We create colonies of people having similar taste.
Some typical facial attribute inputs to this system are:
1. Facial metrology measurements, biometric distances, including a number of facial landmarks such as eyebrows, eyes, jawline, chin, nose, mouth. Each landmark includes an x and y coordinate, measured as a ratio of the image size.
2. The length and width of an imaginary rectangle around the face, to determine distances of each facial landmark relative to the face center.
3. Facial shape, such as oval, round, rectangular, and others.
Collaborative Filter Approach Based on User Votes
Based on the like or dislike reactions of users for each image, we form the user reaction matrix, U, as

|  | item 1 | item 2 |  | item $N$ |
|---|---|---|---|---|
| user 1 | $r_{11}$ | $r_{12}$ | $r_{13}$ ... | $r_{1N}$ |
| user 2 | $r_{21}$ | $r_{22}$ | $r_{23}$ ... | $r_{2N}$ |
| user $M$ | $r_{M1}$ | $r_{M2}$ | $r_{M3}$ ... | $r_{MN}$ | where items are the images representing other users.
Approach:
1. Using known measurement methods, assign a tag for each new profile picture,
2. Determine someone's preferences from his or her previous votes for these appearance types, 3. If a user is requesting a match, if there are certain number of candidates, then, order them by using a user taste similarity match, such as cosine(•) similarity between this particular user's requirements and a candidate's appearance type.

The collaborative filter approach is especially useful when it's hard to model users' taste with known parameters.

Collaborative Filter Approach Based on User Taste Modeling

Here we use the "tags" of each image for appearance types such as hair color, ethnicity, and so on. We, then, add more granularity to the user reaction matrix by defining the entries as $$U_{ij}=w_1 a_1+w_2 a_2+ \ldots +w_n a_n$$

where, for example, $a_1$ is eye color preference match, $a_2$ is hair color preference match, $a_3$ is skin color preference match, and so on.

The adjustable coefficients (weights), representing each user's taste and order or priority for each appearance type, are continuously updated to reflect his or her taste. One well-known approach to tune these weights is gradient descent method applied to user's voting history.

Forming a Set of User Matches

It is generally more practical for many applications to generate a group of matches instead of one-match-at-a-time style due to data traffic delays and communication bandwidth. When preparing a set of candidates, S, the following is a method to create a mix for a given user:

$$S=[m_{c1} m_{c2} \ldots m_{cm} | m_{k1} m_{k2} \ldots m_{kn} | m_{t1} | m_{t2} \ldots m_{tp}]$$

where user match $m_{ci}$'s are the ones matched by the collaborative approach, users $m_{ki}$'s are the ones matched by the faceKernel tagging approach, and users $m_{ti}$'s are the discovery items to test user's reaction to other matches. Here, $m_{ti}$'s can be popular user matches in unrelated clusters or they are to check if the user's taste model has changed.

The match types represented by users $m_{k1} m_{k2} \ldots m_{kn}$ can be users with eye color match, skin color match, hair style match, eyebrow thickness match, golden ratio based face shape match, ethnicity match, and so on.

We add a set of tunable parameters (weights) to each group to assess user's taste priority for each item. For example, for a particular user it may be that hair style may be way more important than eye color. By using these weights, we determine how many of these candidates from each taste group should be included in the set, S.

We inspect the user reaction (mostly in the form of like or dislike votes) and update these tunable parameters, for example, by a gradient descent method.

$$\alpha_1(V_{c1}+V_{c2}+ \ldots V_{cm})+\alpha_2 V_{k1}+\alpha_3 V_{k2}+ \ldots \alpha_{n+1} V_{kn}$$

where $V_{c1}$ represents the vote (mostly like or dislike reaction) for user match c1.

Once all $\alpha_i$'s are tuned, this information is used to determine how many candidates from each group should be included when forming a new S set for this user.

Another approach to determine the number of candidates from each group is to collect the votes, $V_{c1}, V_{c2}, \ldots V_{cm}$, $V_{k1}, V_{k2}, \ldots V_{kn}$ and apply the following update rule:

Assume N is the number of candidates belonging to a certain group included in the set, for example, the number of user with eye color matches.

Update N as $$N_{new}=N_{old}+\Delta$$

where $\Delta$ is an integer number that can be selected as
$\Delta>0$ if the number of likes ratio, such as $(\Sigma V_{ci})/m > \Gamma_1$
$\Delta<0$ if the number of likes ratio, such as $(\Sigma V_{ci})/m < \Gamma_2$
$\Delta=0$ otherwise.

$\Gamma_1$ and $\Gamma_2$ are user defined thresholds, such as $\Gamma_1=0.7$ and $\Gamma_2=0.5$.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a social graph, wherein the social graph comprises:
   a first type of node, referred to as a user-provided node,
   a first type of edge, referred to as a user-provided edge; and
   a second type of edge, referred to as a system-provided edge;
   using at least one electronic processor, managing the social graph comprising:
   creating a user-provided node for each user of a system comprising the social graph;
   allowing a first user-provided node for a first user to become coupled to a second user-provided node for a second user via a first user-provided edge;
   providing a third user-provided node for a third user;
   monitoring first content contributed by the first user-provided node, second content contributed by the second user-provided node, and third content contributed by the third user-provided node in an online social platform represented by the social graph,
   wherein the first content comprises a first facial image of the first user, the second content comprises a second facial image of the second user, and the third content comprises a third facial image of the third user;
   analyzing the first facial image and determining a first appearance type based on the first facial image;
   analyzing the second facial image and determining a second appearance type based on the second facial image;
   analyzing the third facial image and determining a third appearance type based on the third facial image;
   determining a first similarity factor between the first user-provided node and the third user-provided node, wherein the determination comprises a calculation based on the determined first appearance type and the determined third appearance type;
   determining a second similarity factor between the second user-provided node and the third user-provided node, wherein the determination calculation based on the determined second appearance type and determined third appearance type;
   based on the first similarity factor, coupling the first user-provided node to the third user-provided node via a first system-provided edge, wherein the first user and third user are members of a first colony group of the social graph; and
   based on the second similarity factor, not coupling the second user-provided node to the third user-provided node via a system-provided edge, wherein the third user is not a member of the first colony group of the social graph.

2. The method of claim 1 comprising:
delivering a first informational content to the first colony group of the social graph, wherein the first colony group comprises user-provided nodes coupled together via the first system-provided edge, which includes the first and third user-provided nodes, and the first informational content is not delivered to other users not coupled via first system-provided edges.

3. The method of claim 1 wherein the determined first appearance type comprises at least one of attractiveness, gender, or ethnicity, or a combination.

4. The method of claim 1 wherein the determined first appearance type comprises at least one of the first user's facial attributes, the first user's skin color, the first user's eye color, or the first user's hair color, or a combination.

5. The method of claim 1 wherein the analyzing the first facial image comprises a machine learning technique comprising a facial metrology comprising at least one of a cheekbone to jaw width, a width to upper facial height ratio, a perimeter to area ratio, an eye size, a lower face to face height ratio, a face width to lower face height ratio, or a mean of eyebrow height, or any combination of these.

6. The method of claim 1 wherein the analyzing the first facial image comprises a machine learning technique comprising a facial metrology comprising at least one of calculating a ratio of at least one of ear length to interocular distance, ear length to nose width, mideye distance to interocular distance, mideye to nose width, mouth width to interocular distance, lips-chin distance to interocular distance, lips-chin distance to nose width, interocular distance to eye fissure width, interocular distance to lip height, nose width to eye fissure width, nose width to lip height, eye fissure width to nose-mouth distance, lip height to nose-mouth distance, length of face to width of face, nose-chin distance to lip-chin distance, nose width to nose-mouth distance, or mouth width to nose width, or any combination of these.

7. The method of claim 5 wherein the machine learning technique comprises at least one of convolutional neural network, self-learning neural network, generative adversarial network, or facial fingerprints approach.

8. The method of claim 1 wherein via the first user-provided edge, the first user-provided node is separated by one degree of separation from the second user-provided node.

9. The method of claim 1 wherein the managing the social graph comprises:
allowing the second user-provided node to become coupled to a fourth user-provided node for a fourth user via a second user-provided edge, wherein via the second user-provided edge, the first user-provided node is separated by two degrees of separation from the fourth user-provided node.

10. The method of claim 1 comprising:
monitoring fourth content contributed by the first user-provided node, fifth content contributed by the second user-provided node, and sixth content contributed by the third user-provided node in an online social platform represented by the social graph;
monitoring first feedback by others to the fourth content contributed by the first user-provided node, monitoring second feedback by others to the fifth content contributed by the second user-provided node, and monitoring third feedback by others to the sixth content contributed by the third user-provided node;
from the monitored fourth content and first feedback by others to the first user-provided node, generating a first rating vector for the first user-provided node;
from the monitored fifth content and second feedback by others for the second user-provided node, generating a second rating vector for the second user-provided node;
from the monitored sixth content and the third feedback by others for the third user-provided node, generating a third rating vector for the third user-provided node;
determining a third similarity factor between the first user-provided node and the third user-provided node, wherein the determination comprises a computation of a cosine of the first rating vector and the third rating vector; and
determining a third similarity factor between the second user-provided node and the third user-provided node, wherein the determination comprises a computation of a cosine of the second rating vector and the third rating vector.

11. The method of claim 10 comprising:
based on the fourth similarity factor, coupling the first user-provided node to the third user-provided node via a second system-provided edge, wherein the first user and third user are members of a second colony group of the social graph.

12. The method of claim 11 comprising:
based on the fourth similarity factor, not coupling the second user-provided node to the third user-provided node via a system-provided edge, wherein the third user is not a member of the second colony group of the social graph.

13. A method comprising:
providing a social graph, wherein the social graph comprises:
a first type of node, referred to as a user-provided node,
a first type of edge, referred to as a user-provided edge; and
a second type of edge, referred to as a system-provided edge;
using at least one electronic processor, managing the social graph comprising:
creating a user-provided node for each user of a system comprising the social graph;
allowing a first user-provided node for a first user to become coupled to a second user-provided node for a second user via a first user-provided edge;
providing a third user-provided node for a third user;
monitoring first content contributed by the first user-provided node, second content contributed by the second user-provided node, and third content contributed by the third user-provided node in an online social platform represented by the social graph,
wherein the first content comprises a first facial image of the first user, the second content comprises a second facial image of the second user, and the third content comprises a third facial image of the third user;
analyzing the first facial image and determining a first appearance type based on the first facial image;
analyzing the second facial image and determining a second appearance type based on the second facial image;
analyzing the third facial image and determining a third appearance type based on the third facial image;
monitoring first feedback by others to the first content contributed by the first user-provided node, monitoring second feedback by others to the second content contributed by the second user-provided node, and monitoring third feedback by others to the third content contributed by the third user-provided node;

from the monitored first content and first feedback by others to the first user-provided node, generating a first rating vector for the first user-provided node;

from the monitored second content and second feedback by others for the second user-provided node, generating a second rating vector for the second user-provided node;

from the monitored third content and the third feedback by others for the third user-provided node, generating a third rating vector for the third user-provided node;

determining a first similarity factor between the first user-provided node and the third user-provided node, wherein the determination comprises a computation of a cosine of the first rating vector and the third rating vector;

determining a second similarity factor between the second user-provided node and the third user-provided node, wherein the determination comprises a computation of a cosine of the second rating vector and the third rating vector;

based on the first similarity factor, coupling the first user-provided node to the third user-provided node via a first system-provided edge, wherein the first user and third user are members of a first colony group of the social graph;

based on the second similarity factor, not coupling the second user-provided node to the third user-provided node via a system-provided edge, wherein the third user is not a member of the first colony group of the social graph.

14. The method of claim 13 comprising:
delivering a first informational content to the first colony group of the social graph, wherein the first colony group comprises user-provided nodes coupled together via the first system-provided edge, which includes the first and third user-provided nodes, and the first informational content is not delivered to other users not coupled via first system-provided edges.

15. The method of claim 13 wherein via the first user-provided edge, the first user-provided node is separated by one degree of separation from the second user-provided node.

16. The method of claim 13 wherein the managing the social graph comprises:
allowing the second user-provided node to become coupled to a fourth user-provided node for a fourth user via a second user-provided edge, wherein via the second user-provided edge, the first user-provided node is separated by two degrees of separation from the fourth user-provided node.

17. The method of claim 13 comprising:
receiving a reaction to the first informational content from one or more user-provided nodes coupled together via the first system-provided edge in the first colony group;
based on the reaction, selecting a second informational content for delivery to the first colony group; and
delivering the second informational content to the first colony group of the social graph.

18. The method of claim 17 comprising:
disallowing delivering of the first informational content to the second user-provided node, which is not coupled to the first system-provided edge.

19. The method of claim 13 wherein the managing the social graph comprises:
allowing the second user-provided node to become coupled to a fourth user-provided node for a fourth user via a second system-provided edge.

20. The method of claim 19 comprising:
delivering a first informational content to a first colony group of the social graph, wherein the first colony group comprises user-provided nodes coupled together via the first system-provided edge, which includes the first and third user-provided nodes; and
delivering a second informational content to a second colony group of the social graph, wherein the second colony group comprises user-provided nodes coupled together via the second system-provided edge, which includes the second and fourth user-provided nodes.

* * * * *